United States Patent [19]
Kuriyama et al.

[11] Patent Number: 5,788,601
[45] Date of Patent: Aug. 4, 1998

[54] AUTOMATIC TRANSMISSION CONTROL SYSTEM

[75] Inventors: Minoru Kuriyama, Higashihiroshima; Kazuo Sasaki, Hiroshima, both of Japan

[73] Assignee: Mazda Motor Corporation, Hiroshima, Japan

[21] Appl. No.: 623,169

[22] Filed: Mar. 28, 1996

[30] Foreign Application Priority Data

Mar. 30, 1995 [JP] Japan ................. 7-073469
Mar. 6, 1996 [JP] Japan ................. 8-049221

[51] Int. Cl.⁶ ................................................ F16H 61/00
[52] U.S. Cl. .................. 477/71; 477/76; 477/72; 477/98
[58] Field of Search ................. 477/70, 71, 72, 477/76, 77, 97, 98, 121

[56] References Cited

U.S. PATENT DOCUMENTS

| | | | |
|---|---|---|---|
| 5,014,575 | 5/1991 | Fujiwara et al. | 477/98 X |
| 5,270,628 | 12/1993 | Noguchi et al. | 477/121 X |
| 5,307,269 | 4/1994 | Kohno | 477/98 X |
| 5,309,791 | 5/1994 | Takada et al. | 477/98 |
| 5,349,885 | 9/1994 | Yoshimura et al. | 477/162 X |
| 5,518,468 | 5/1996 | Sametz et al. | 477/98 X |
| 5,556,349 | 9/1996 | Ishii et al. | 477/76 |
| 5,558,597 | 9/1996 | Oba et al. | 477/98 |

FOREIGN PATENT DOCUMENTS 633815  5/1994  Japan.

*Primary Examiner*—Charles A. Marmor
*Assistant Examiner*—Peter T. Kwon
*Attorney, Agent, or Firm*—Sixbey, Friedman, Leedom & Ferguson, PC; Gerald J. Ferguson, Jr.; Donald R. Studebaker

[57] ABSTRACT

An automatic transmission control system in which a specific one of friction coupling elements is selectively locked and unlocked to provide a specific gear initiates locking the specific friction coupling element to execute a gear shift to the specific gear at a level of input torque to the automatic transmission from the torque converter higher when a friction-related parameter demonstrates a high friction coefficient of the coupling element than when demonstrating a low friction coefficient.

16 Claims, 18 Drawing Sheets

FIG. 4

| SHIFT LEVER POSITION | | CLUTCH | | | | BRAKE | | ONE-WAY CLUTCH | |
|---|---|---|---|---|---|---|---|---|---|
| | | REV (24) | FED (20) | CST (21) | 3-4 (27) | LRV (25) | 2-4 (23) | OWC (26) | OWC (22) |
| PARK(P) | | ○ | | | | | | | |
| REVERSE(R) | | | | | | ○ | | | |
| NEUTRAL(N) | | | | | | | | | |
| DRIVE(D) | 1ST GEAR | | ○ | | | | | (○) | ○ |
| | 2ND GEAR | | ○ | | | | ○ | | (○) |
| | 3RD GEAR | | ○ | ○ | ○ | | | | (○) |
| | 4TH GEAR | | | ○ | ○ | | ○ | | |
| SECOND SPEED (2) | 1ST GEAR | | ○ | | | | | (○) | ○ |
| | 2ND GEAR | | ○ | ○ | | | ○ | | (○) |
| | 3RD GEAR | | ○ | ○ | ○ | | | | (○) |
| FIRST SPEED (1) | 1ST GEAR | | ○ | ○ | | | | | ○ |
| | 2ND GEAR | | | ○ | | ○ | ○ | | ○ |

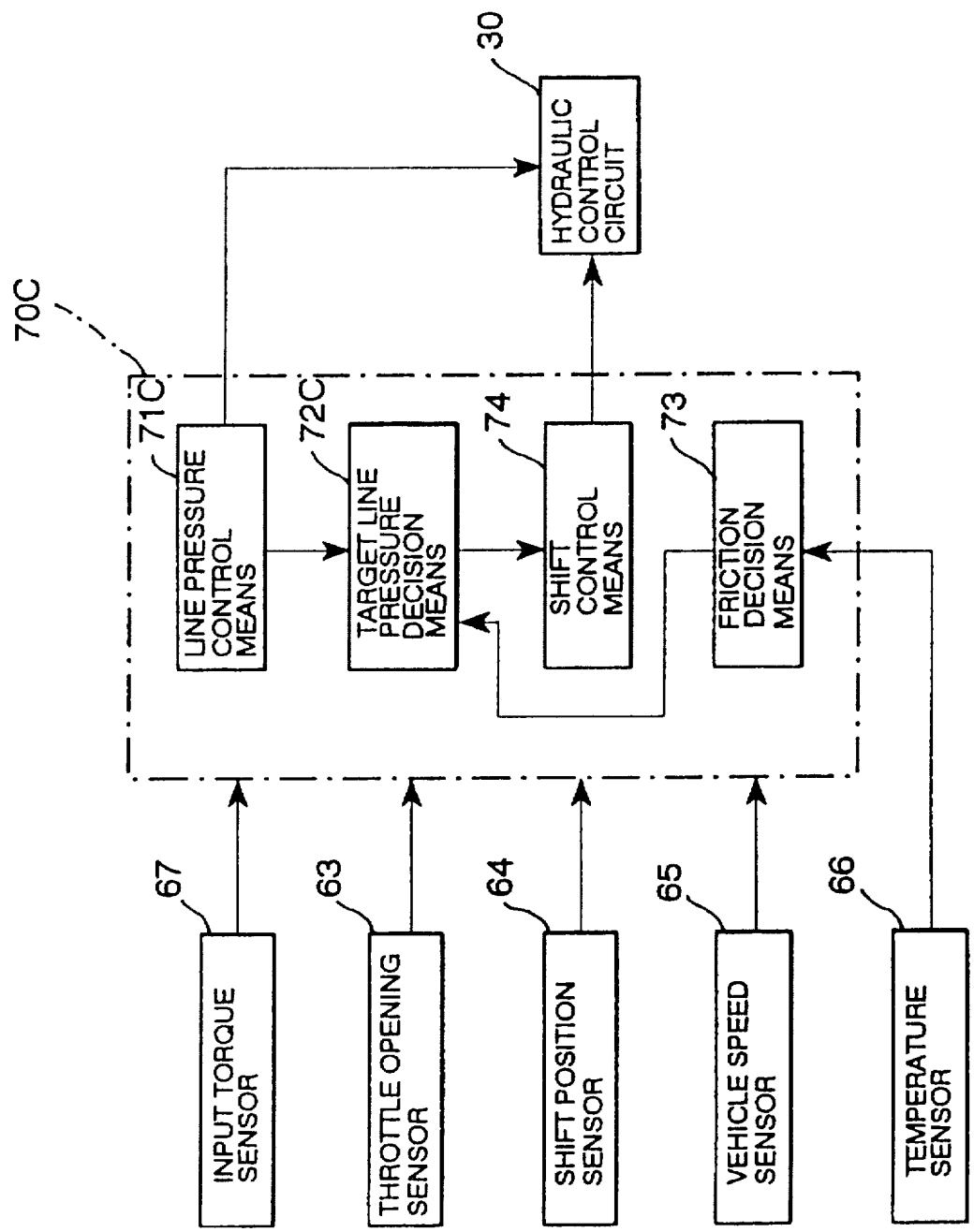

AUTOMATIC TRANSMISSION CONTROL SYSTEM

BACKGROUND OF THE INVENTION

1. Field of the Invention

The invention relates to a control system for an automatic transmission installed in an automotive vehicle.

2. Description of Related Art

Typically, in an automatic transmission, a transmission gear mechanism, connected to an output shaft of a torque converter, incorporates a plurality of friction coupling elements such as brakes, clutches and related components which are selectively coupled and uncoupled in order to provide desired gears. One of such an automatic transmission is known from, for instance, Japanese Unexamined Patent Publication No. 6-33815. This type of automatic transmission selectively couples and uncouples specific friction coupling elements to provide up-shifting to higher gear ratios, and down-shifting to lower gear ratios.

The type of automatic transmission described above will generate a significant shock due to quick coupling and uncoupling the specific friction coupling elements if a shift time is excessively short, and conversely will cause rapid wear of the specific friction coupling elements due to long duration of sliding contact if the shift time is excessively long. Accordingly, it is preferable to establish an optimum shift time necessary for a gear shift to be completed.

Even if a target or desired shift time has been established, when the brake band (one of the aforesaid specific friction coupling elements) is applied to change the transmission gear ratio, it has been proved that a gear shift is executed more quickly when the automatic transmission is cold compared to when the automatic transmission has been warmed up, thus generating a pronounced shift shock. Reducing this shift shock is a prime concern in the design of automatic transmissions. This shift shock is considered to stem from the tendency of working oil to lose its fluidity in the automatic transmission due to its increased viscosity when the automatic transmission is cold and, consequently, to prevent the working oil from adhering to the contact surfaces of the specific friction coupling components, for instance the surface of a brake band, thus increasing the frictional coefficient of the contact surface with the result of allowing the specific friction coupling element to lock easily.

SUMMARY OF THE INVENTION

It is an object of the invention to provide an automatic transmission control system which can effectively reduces a shift shock accompanying a gear shift in which a specific friction coupling element is locked, even when the automatic transmission is still in a cold condition.

Typically, input torque to the transmission gear mechanism from the torque converter rises once following an increase in engine load and, subsequently, falls with a gradual increase in turbine speed. Accordingly, if a gear shift is initiated earlier before the input torque has sufficiently fallen, the input torque forces the specific friction coupling element to slip even if the specific friction coupling element retains high friction force, so as to prevent it from locking abruptly.

The invention has been made on the basis of that concept and accomplishes its object by providing a control system for an automatic transmission of the type incorporating a torque converter and a transmission gear mechanism equipped with a specific friction coupling element which is locked to cause a shift to a specific gear. The control system includes a frictional condition monitoring means to monitor a frictional condition of the specific friction coupling element using a friction-related parameter in relation to a friction coefficient of the specific friction coupling element and initiates locking the specific friction coupling element at a level of input torque to the transmission gear mechanism from the torque converter higher when the friction-related parameter demonstrates that the friction coefficient is high than when the friction-related parameter demonstrates that the friction coefficient is low, so as thereby to execute a gear shift to the specific gear timely. The term "friction coefficient" used in this specification refers to a frictional force of a contact surface usually during, but even before, coupling. Locking the specific friction coupling element commences in response to an occurrence of a shift command signal.

With the control system, locking the specific friction control element is initiated at a level of input torque higher, in other words at a time earlier, when the parameter demonstrates that the friction coefficient of the specific friction coupling element is low than when indicating a low friction coefficient. This prevents the specific friction coupling element from abruptly locking even when the automatic transmission is in a cold condition where a tendency for working oil toward difficulty in adhering to the contact surface of the specific friction coupling component is significant and, thus the frictional coefficient of the contact surface is increased with the result of allowing the specific friction coupling element to lock easily.

This control system shows significant effects when applied, in particular, to a shift brake of the type having a brake drum and a brake band which is locked to shift the automatic transmission to a second gear in which the level of input torque is relatively high.

The frictional condition monitoring means may be a temperature sensor to monitor the temperature of working oil applied to the specific friction coupling element.

In regard to the shift timing control, the control system may be constructed as to initiate locking the specific friction coupling element at a level of input torque from the torque converter higher when a parameter in relation to the torque ratio has attained the torque ratio decision value and to alter the decision value according to the friction-related parameter such that locking the specific friction coupling element is caused at a level of intake torque higher when the friction-related parameter demonstrates that the friction coefficient is high that when indicating a low friction coefficient. If the specific coupling element is in the high friction condition where it tends to easily lock, the control system changes the decision value so as to initiate locking the specific friction coupling element at a high level of input torque which increases the tendency for the specific friction coupling element to slip.

In cases where, while the friction-related parameter demonstrates a high friction coefficient, the engine throttle is opened largely and it is desirable to hold lower gears, it is inappropriate to initiate locking the specific friction coupling element at input torque which is still at a high level, i.e. at an advanced shift time. Large throttle opening unconditionally allows engine torque and input torque to be high and generates a high surface pressure of the specific coupling element, allows an oil film on the friction surface to be easily and instantaneously broken. Consequently, the extent of oil adhesion to the friction surface of the specific friction coupling element before locking is less effective to a shift time.

In the light of the above, the control system causes a shift to the specific gear at a torque ratio increased higher as the throttle opening demonstrated by the throttle-related parameter decreases when the friction-related parameter demonstrates a high friction coefficient and, on the other hand, changes the torque-ratio decision value such that the shift to the specific gear is initiated at a torque ratio lower when the friction-related parameter demonstrates a low friction coefficient than when it demonstrates a high friction coefficient. While this also prevent abrupt locking of the specific friction coupling element, since torque-ratio decision value is altered to correspond to a low torque ratio in a range of throttle opening at which the friction coefficient of the specific friction coupling element before locking is less effective to a shift time, the demand for acceleration performance is satisfied. As apparent, locking the specific friction coupling element is initiated at a level of input torque lower when the friction-related parameter demonstrates a low friction coefficient than when demonstrating a high friction coefficient.

In the cases where the shift timing is determined based on input torque or a torque-related parameter, the control system may take a vehicle speed-related parameter into consideration as well. In such a case, locking the specific friction coupling element is initiated when the vehicle speed-related parameter demonstrates a specified speed. That is, the control system causes said specific friction coupling element to lock when, while the vehicle speed-related parameter demonstrates a specified vehicle speed for gear shifting, the torque-related parameter has attained a specified decision level of input torque and changes the decision level such that the gear shift initiates at a level of input torque higher when the friction-related parameter demonstrates a high friction coefficient than when it demonstrates a low friction coefficient.

The control system may causes the specific friction coupling element to lock based on a first shift characteristic when the friction-related parameter demonstrates a low friction coefficient and, on the other hand, based on a second shift characteristic when demonstrating a high friction coefficient. The first and second shift characteristics are established in relation to vehicle speed and throttle opening and such that, for same throttle opening, a gear shift to the specified gear is caused at a speed lower if the gear shift attributes the second shift characteristic than if the gear shift attributes the first shift characteristic.

The control system may further cause the specific friction coupling element to lock, on one hand, at a time defined by a shift characteristic when the friction-related parameter demonstrates a low friction coefficient and, on the other hand, at a time when, while the friction-related parameter demonstrates a high friction coefficient, the torque ratio-related parameter demonstrates a torque ratio than a specified decision ratio. The decision is established such that the gear shift is achieved at input torque higher in level when being caused due to the fact that the friction-related parameter demonstrates that the friction coefficient is high than when being caused due to the fact that the friction-related parameter demonstrates that the friction coefficient is low.

This control system shows significant effects when applied, in particular, to a friction coupling element, such as a shift brake of the type having a brake drum and a brake band which is locked to shift the automatic transmission to a second gear in which the level of input torque is relatively high.

BRIEF DESCRIPTION OF THE DRAWINGS

The above and other objects and features of the present invention will be clearly understood from the following description with respect to a preferred embodiment thereof when considered in conjunction with the accompanying drawings, in which:

FIG. 4 is a table showing the relation of a gear and operation of friction coupling elements;

FIG. 9 is a block diagram showing an automatic transmission control system in accordance with another embodiment of the invention;

DETAILED DESCRIPTION OF THE PREFERRED EMBODIMENTS

Figure 1:
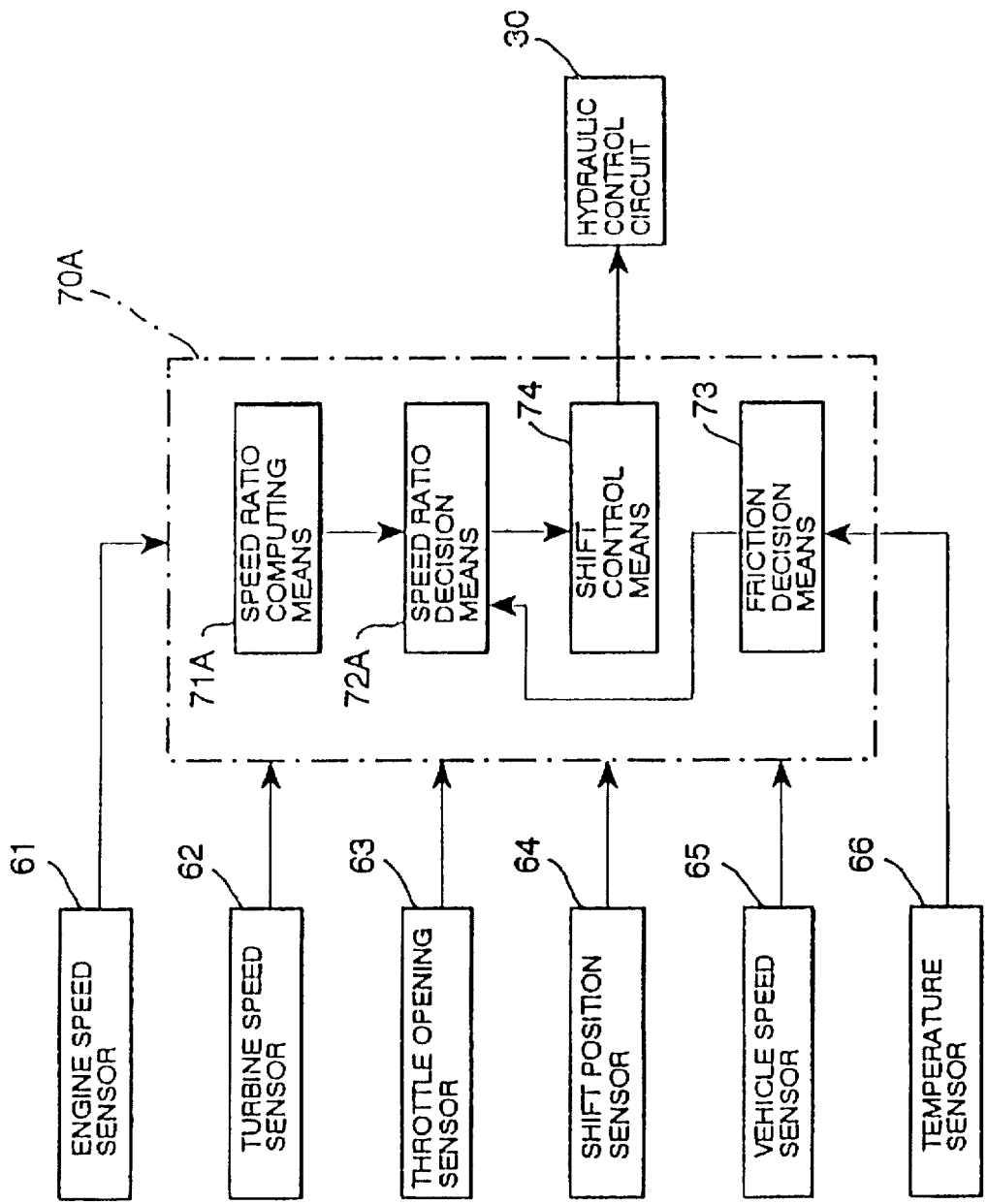
FIG. 1 is a block diagram showing an automatic transmission control system in accordance with an embodiment of the invention.
Figure 2:
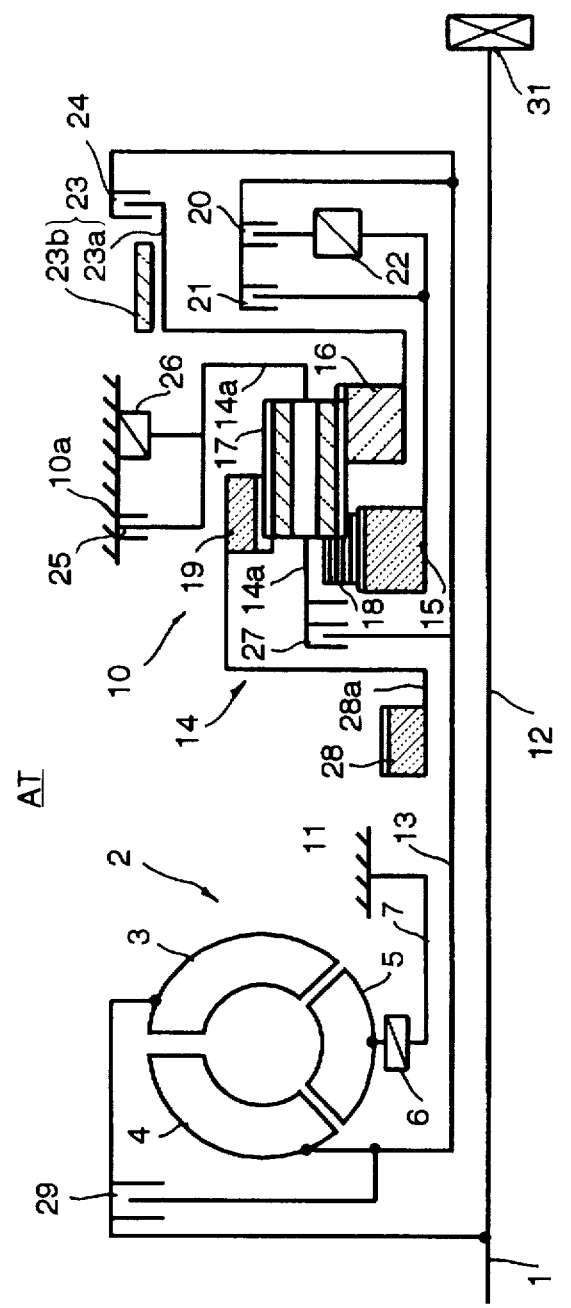
FIG. 2 is a schematic cross-sectional view showing an automatic transmission which is controlled by the control system of the invention.
Figure 3:
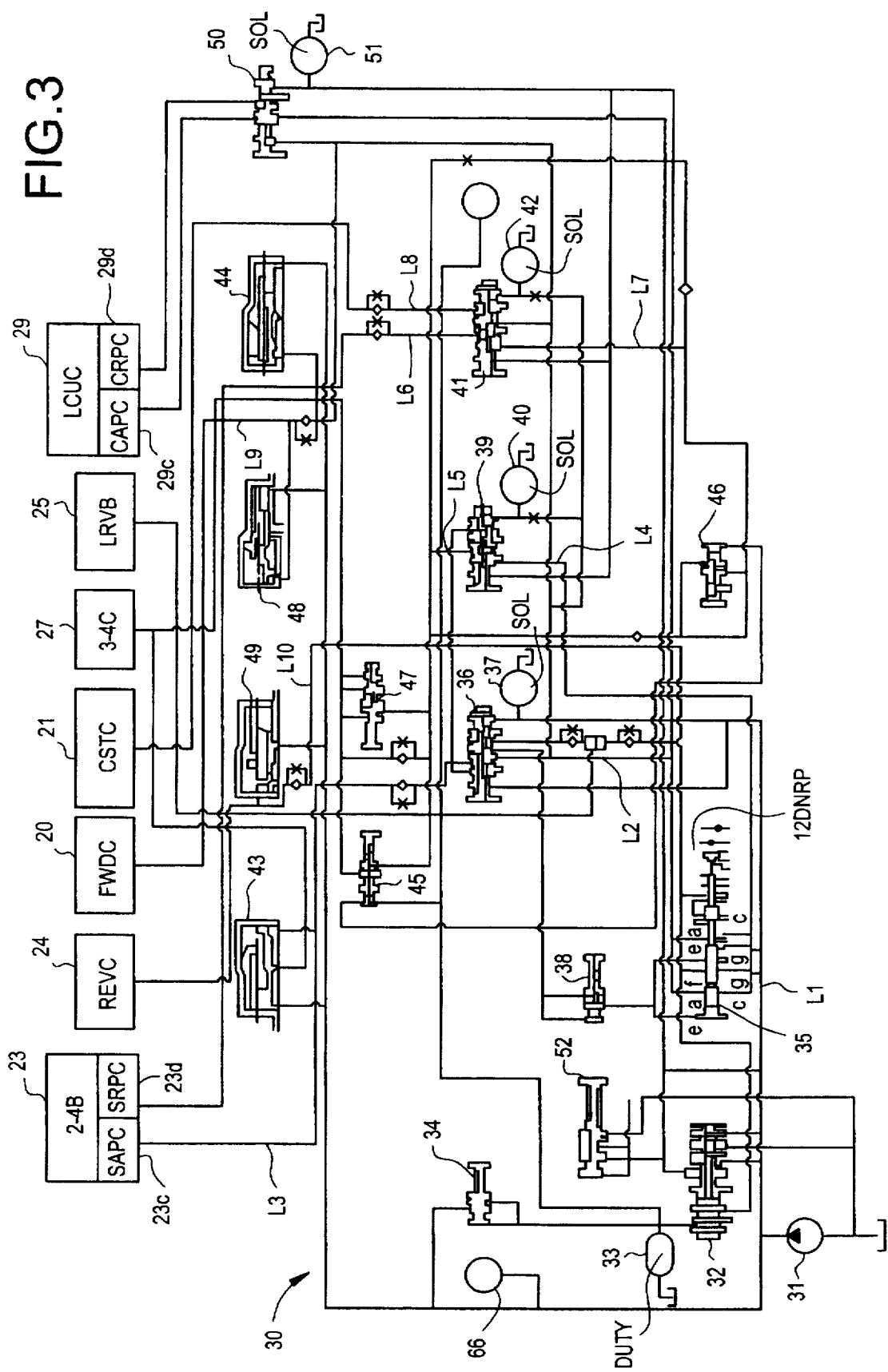
FIG. 3 is a hydraulic control circuit of the automatic transmission control system

Referring to the drawings in detail, in particular to FIGS. 1 through 6 which show an embodiment of the invention, an automatic transmission 2 comprises a transmission gear mechanism 10, a torque converter 2 to which the transmission gear mechanism 10 at its input end is connected, and a hydraulic control circuit 30, as shown in detail in FIG. 3. The transmission gear mechanism 10 is of a type having a plurality of friction coupling elements, such as clutches and brakes, which are selectively coupled and uncoupled to alter the power transmission path so as thereby to shift the automatic transmission 2 into any possible gear. The hydraulic control circuit 30 controls selective engagement and disengagement of the specific friction coupling elements.

As shown in detail in FIG. 2, the torque converter 2 incorporates an oil pump 3, a turbine 4, and a stator 5. The oil pump 3 is fixedly installed in the interior of a converter casing connected to an engine output shaft 1. The turbine 4 is positioned facing the oil pump 3 and is rotationally driven by the force of the working oil discharged from the oil pump 3. The stator 5 is positioned between the oil pump 3 and turbine 4 and is fixedly supported on a stationary shaft 7 by means of a one-way clutch 6 so as to turn only in a single direction.

Transmission gear mechanism 10 is equipped with a center shaft 12 of which the forward end (the left end as viewed in FIG. 2) is connected to the engine output shaft 1, and of which the rear end (the right end as viewed in FIG. 2) is connected to the oil pump 3. A hollow cylindrical turbine shaft 13 is installed around the center shaft 12 with its forward end fixedly connected to the turbine 4 of the torque converter 2. A Rabinyo type planetary gear set 14, which is installed around the turbine shaft 13, comprises a small sun gear 15, a large sun gear 16, a long pinion gear 17, a short pinion gear 18, a ring gear 19, and various friction coupling elements. The transmission gear mechanism 10 at its one end remote from the engine is provided with a forward clutch 20 and a coast clutch 21 in parallel with each other between the turbine shaft 13 and small sun gear 15. The forward clutch 20 connects and disconnect power transmission from the turbine shaft 13 to the small sun gear 15 through a one-way clutch 22. Similarly, the coast clutch 21 connects and disconnects power transmission from the turbine shaft 13 to the small sun gear 15. A 2-4 brake 23 is installed around the coast clutch 21. This 2-4 brake 23 includes a brake drum 23a connected to the large sun gear 16, and a brake band 23b which can be applied against the brake drum 23a. The large sun gear 16 is locked in operation as a result of coupling the 2-4 brake 23. A reverse clutch 24 is installed radially outside of the 2-4 brake 23 and forms a power transmission path between the turbine shaft 13 and large sun gear 16 through the 2-4 brake 23. A low-reverse brake 25 and a one-way clutch 26 are installed between a carrier 14a of the planetary gear set 14 and casing 10a of transmission gear mechanism 10. This low-reverse brake 25 brings the carrier 14a into engagement with and disengagement from the transmission gear casing 10a. A 3-4 clutch 27 is installed on a side of the planetary gear set 14 close to the engine, which connects and disconnects power transmission between the carrier 14a and turbine shaft 13. An output gear 28 is installed to the 3-4 clutch 27 and is connected to a ring gear 19 through the output shaft 28a. The engine output shaft 1 and turbine shaft 13 are mechanically coupled directly to each other, not through fluid coupling but by means of a lockup clutch 29.

Transmission gear mechanism 10 provides four forward gears and one reverse gear by selectively locking and unlocking the friction coupling elements including at least the clutches 20, 21, 24 and 27 and brakes 23 and 25. The relationship relation between the selected gears and operation of the clutches and brakes is shown more specifically in the table in FIG. 4.

FIG. 3 shows the hydraulic control circuit 30 including the oil pump 31 connected to and driven by the engine output shaft 1 to discharge and supply a hydraulic operating oil to a pressure line L1. This operating oil is regulated as a line pressure by means of a regulator valve 32 and duty solenoid valve 33. More specifically, the discharged pressure from the oil pump 31 is reduced to a specified level by a reducing solenoid valve 34 after which it is adjusted to duty controlled pressure through the duty solenoid valve 33. As is well known, the duty solenoid valve 33 is periodically opened and closed at a controlled duty rate so as to regulate the drain volume of the operating oil which in turn controls the level of pressure. This regulated hydraulic pressure is applied as pilot pressure to the regulator valve 32 in order to regulate the line pressure according to the pilot pressure. In other wards, a line pressure varying mechanism is formed by the these valves 32, 33 and 34. The operation of the duty solenoid valve 33 is controlled by means of a control unit 70A, which is mainly comprised a microcomputer and will be described in detail later, with the result that the line pressure is controlled.

Line pressure output from the regulator valve 32 is supplied to a port "g" of a manual shift valve 35. The manual shift valve 35 is placed at any position within possible range positions assigned to a park (P) range, a neutral (N) range, a drive (D) range, a second speed (2) range, and a first speed (1) range through manual operation of the shift lever and transfers the line pressure to ports assigned to the respective ranges in response to selection of the respective ranges from the port "g". For example, the manual shift valve 35 transfers the line pressure from the port "g" to ports "a" and "e" if set at the first speed (1) range; to ports "a" and "c" if set at the second speed (2) range or to the drive (D) range; and to a port "f" if set at the reverse (R) range. The port "a" of the manual shift valve 35 is connected to a 1-2 shift valve 36 through a pressure line L2. The pilot pressure to 1-2 shift valve 36 is controlled through the operation of 1-2 solenoid valve 37.

More specifically, when the automatic transmission 2 is shifted into the first gear, the 1-2 solenoid valve 37 is deactivated or assumes OFF, causing the 1-2 shift valve 36 to shift its spool to a left end position as viewed in FIG. 3 so as thereby to bring its drain port into communication with a pressure line L3 leading to a brake apply pressure chamber (SAPC) 23c of the 2-4 brake 23. In this instance, the 2-4 brake 23 is of a type having a brake apply pressure chamber (SAPC) 23c and a brake release pressure chamber (SRPC) 23d. This type of 2-4 brake is locked only when operating pressure is applied into the brake apply pressure chamber (SAPC) 23c but released or drained from the brake release pressure chamber (SRPC) 23d and is unlocked in any case excepting the above event. When the automatic transmission 10 is running in the second through fourth gears, the 1-2 solenoid valve 37 is activated or assumes ON, causing the 1-2 shift valve 36 to shift its spool to a right end position as viewed in FIG. 3 so as thereby to bring the port "a" of the manual shift valve 35 into communication with the brake apply pressure chamber (SAPC) 23c of the 2-4 brake 23 for application of the line pressure to the brake apply pressure chamber (SAPC) 23c of the 2-4 brake 23. Further, when the automatic transmission 2 is running in the first gear in the first speed (1) range, the 1-2 shift valve 36 supplies the operating pressure to a low reverse brake 25 from the port "e" of the manual shift valve 35 through a low reducing valve 38.

Operating pressure from the port "a" of the manual shift valve 35 is also supplied, as pilot pressure, to a 2-3 shift valve 39. This 2-3 shift valve 39 is connected to port "c" of the manual valve 35 through a pressure line L4 so as to receive the pilot pressure controlled by a 2-3 solenoid valve 40. As a result, when the automatic transmission 2 is in the first gear or in the second gear, the 2-3 solenoid valve 40 is activated or assumes ON, causing the 2-3 shift valve 39 to shift its spool to the right end position so as thereby to release or unlock the 3-4 clutch 27 as a result of bringing the 3-4 clutch 27 into communication with its drain port through a pressure line L5. In the third gear and fourth gear, the 2-3 solenoid valve 40 is deactivated or assumes OFF, causing the 2-3 shift valve 38 to shift its spool to the left end position so as thereby to bring the manual shift valve 35 at the port "c" into communication with the 3-4 clutch 27 through a pressure line L5 and supply the operating pressure to the 3-4 clutch 27 for locking.

A 3-4 shift valve 41 is connected to the pressure line L5. Pilot pressure for the 3-4 shift valve is controlled by means of a 3-4 solenoid valve 42. Specifically, when the automatic transmission 2 is in any one of the first, second and fourth gears in the drive (D) range, or in the first gear in the second speed (2) range, the 3-4 solenoid valve 42 assumes ON, causing the 3-4 shift valve 41 to shift its spool to the right end position so as thereby to bring its drain port into communication with a pressure line L6 leading to a brake release pressure chamber (SRPC) 23d of the 2-4 brake 23. Further, when the automatic transmission 2 is in the third gear in the drive (D) range, in any one of the second and third gears in the second speed (2) range, or in any one of the first and second gears in the first speed (1) range, the 3-4 solenoid valve 42 assumes OFF, causing the 2-3 shift valve 39 to shift its spool to the left end position so as thereby to bring the line pressure L6 into communication with the pressure line L5 leading to the 2-3 shift valve 39 with the result of supplying operating pressure to and discharging operating pressure from the brake release pressure chamber (SRPC) 23d of the 2-3 shift valve 23 according to spool positions of the 2-3 shift valve 39.

The 3-4 shift valve 41 operates to change over between supply and release of operating pressure between pressure lines L7 and L8 leading to the port "a" of the manual shift valve 35 and the coast clutch 21, respectively, so as to lock and unlock the coast clutch 21. With the hydraulic control circuit 30, the operation of these shift valves 36, 39 and 41 are controlled by the solenoid valves 37, 40 and 42 to selectively lock and unlock the 2-4 shift brake 23 and 3-4 clutch 27 as the friction coupling elements as shown in FIG. 4.

Manual shift valve 35 at the port "a" is directly connected is directly connected to a forward clutch 20 by way of a pressure line L9 with an N-D accumulator 48 installed therein and supplies the line pressure to forward clutch 20 as locking pressure in the drive (D), second speed (2) and first speed (1) ranges. Similarly, the manual shift valve 35 at the port "f" is directly connected to the reverse clutch 24 by way of a pressure line L10 with an N-R accumulator 49 installed therein and supplies the line pressure to the reverse clutch 24 as locking pressure in the reverse (R) range.

Hydraulic control circuit 30 is further provided with a lockup control valve 50, a lockup solenoid valve 51 and a converter relief valve 52.

As shown in FIG. 1, the engine to which the automatic transmission 2 is connected incorporates a variety of sensors, such as an engine speed sensor 61, a turbine speed sensor 62, a throttle sensor 63, a shift position sensor 64, a vehicle speed sensor 65, and a temperature sensor 66. The turbine speed sensor 62 monitors the rotational speed of turbine shaft 13. The shift position sensor 64 detects the operated position (P, R, N, D, 2 and 1 positions) of the driver-controlled shift lever (not shown). The brake temperature sensor 66 is installed in the hydraulic control circuit 30 with the purpose of monitoring the temperature of working oil which represents the temperature of various friction coupling elements. These sensors feed control signals to the control unit 70A.

Control unit 70A incorporates a microcomputer functioning as a speed-ratio computing means 71A, a speed-ratio decision means 72A, a friction decision means 73, and a shift control means 74. The friction decision means 73 determines if the temperature of working oil $\tau$ monitored by the temperature sensor 60 is lesser than a specified decision temperature $\tau_0$. The speed-ratio computing means 71A computes a speed-ratio e between the engine speed $n_1$ monitored by the engine speed sensor 61 and turbine speed $n_2$ monitored by the turbine speed sensor 62. The speed-ratio decision means 72A, in which the relationship between throttle opening value TVO and speed-ratio decision value $\alpha$ shown in the following Table I is stored.

TABLE I

| TVO | 1/16 | 1/8 | 2/8 | 4/8 | 6/8 | Full |
|---|---|---|---|---|---|---|
| $\alpha$ | 0.5 | 0.7 | 0.8 | 0.9 | 0.95 | 0.95 |

If the speed-ratio decision means 72A determines that the temperature of working oil $\tau$ has not attained the specified decision temperature $\tau_0$, the speed-ratio decision value $\alpha$ is set as a value according to the throttle opening TVO derived from the throttle sensor 63. On the other hand, if the working oil temperature $\tau$ is determined as being greater than the t temperature $\tau_0$, the maximum value among the possible speed-ratio decision values $\alpha$ in Table I is set. In both cases, the speed-ratio decision means 72A compares the magnitude of the speed decision value $\alpha$ with the magnitude of the virtual speed-ratio value e calculated by the speed-ratio computation means 71A and determines which is larger. In this instance, in a high temperature range, a value larger than the maximum value may be used as the speed-ratio decision value $\alpha$.

Shift control means 74 determines a gear shift timing at which the shift solenoid valves 37, 40 and 42 in hydraulic control circuit 30. More specifically, for example, at a gear shift from a first (1st) gear to a second (2nd) gear, the shift control means 74 operates in a manner as to output a shift control signal to the solenoid valve 37 to initiate the upshift at a moment when the computed speed-ratio value "e" attains the speed-ratio decision value $\alpha$.

Figure 5:
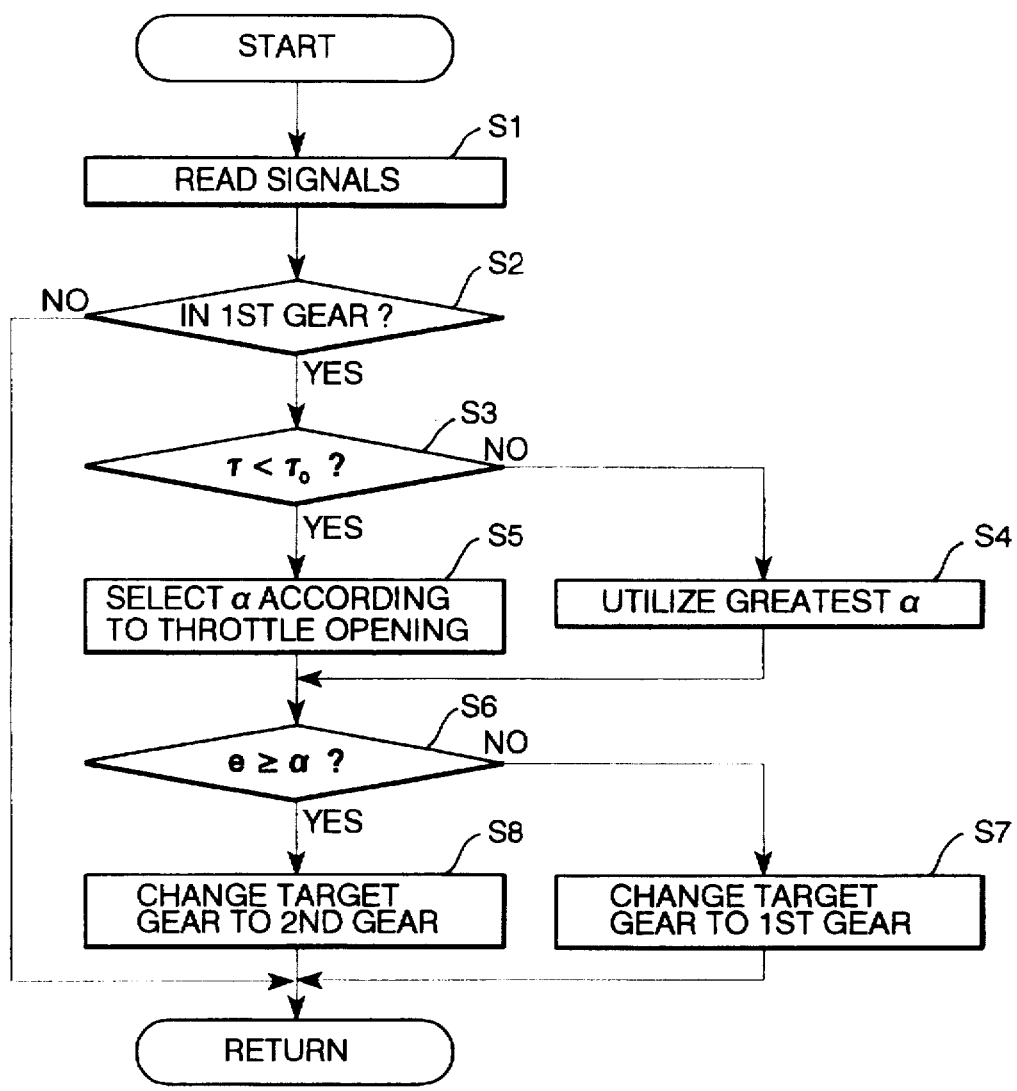
FIG. 5 is a flow chart illustrating the shift control sequence routine for the control system of FIG. 1.

The operation of upshifting will be understood by reviewing the flow chart illustrating the upshift control sequence routine shown in FIG. 5.

When the sequence logic commences and control proceeds to the function block at step S1 where signals are read in from the respective sensors. At step S2, a decision is made as to whether the automatic transmission 2 is in the 1st gear. If the answer to the decision is "YES" then, another decision is made at step S3 to consider the working oil temperature $\tau$. If the working oil temperature $\tau$ is determined as being greater than the t temperature $\tau_0$, the maximum value of all values in Table I, for instance 0.95 in this embodiment, is employed as the virtual speed-ratio decision value $\alpha$ at step S4A. In an instance where the working oil temperature $\tau$ has not yet attained the t temperature $\tau_0$, i.e. the answer to the decision made at step S3 is "YES", then, the speed-ratio decision value $\alpha$ is selected from the values in Table I according to the throttle opening TVO at step S5A. The target gear is maintained as the 1st gear at step S7 until it is determined that the computed speed-ratio "e" has attained the speed-ratio decision value α at step S6A. When, the target gear is changed to the 2nd gear and an upshift to the 2nd gear is initiated at step S8 if the computed speed-ratio value "e" attains the speed-ratio decision value α at step S6A.

With the control system, when the working oil temperature τ is in a low temperature range, the 2-4 brake 23 is activated to initiate an upshift from the 1st gear to the 2nd gear at a speed-ratio "e" lower than in a high temperature range. Accordingly, the 2-4 brake 23 is prevented from excessively quickly locking with an effect of largely reduced shift shock as a result of a high level of input torque even when the frictional coefficient at the contact surfaces of 2-4 brake band 23 has become large due to the increased viscosity of the transmission working oil resulting from lower oil temperatures. Together, when the throttle opening TVO is small even when the working temperature τ remains in the low range, the 2-4 brake 23 is initiated to lock at the speed-ratio "e" determined by selecting a speed-ratio decision value α lower than when the throttle opening TVO is large. The tendency of the 2-4 brake 23 to lock excessively fast is markedly reduced by causing the 2-4 brake 23 to lock when the input torque is still at a high level, especially, in a low range of throttle opening where a shift time necessary for the 2-4 brake to completely lock is largely dependent on the temperature of working oil, in other words, on the frictional coefficient of the contact surface of 2-4 brake 23 immediately before locking. Conversely, the alteration in upshift time, or the extent of advancing the timing of upshifting, is reduced so as to hold the automatic transmission 2 in the 1st gear as long as possible in a range of large where the fictionally coupling characteristic of 2-4 brake 23 is less dependent on the temperature of working oil. This provides desired response to the demand for acceleration.

In a similar manner, the upshift timing at which the 3-4 clutch locks to cause an upshift from the 2nd gear to 3rd gear can be controlled according to the friction coefficient of the 3-4 clutch which is grasped from the temperature of working oil in the automatic transmission 2.

Figure 6:
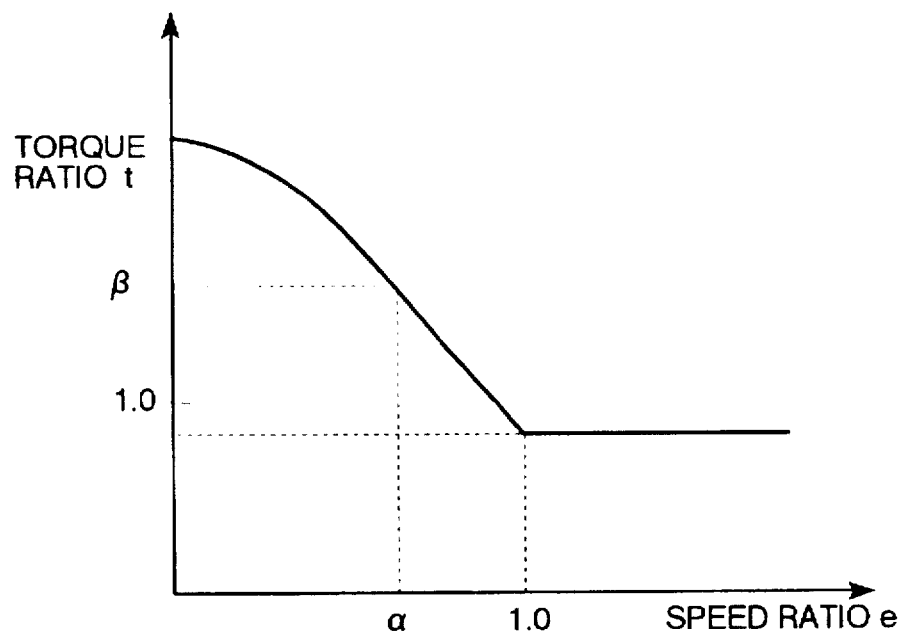
FIG. 6 shows a graph of the relation between speed ratio and torque ratio.
Figure 7:
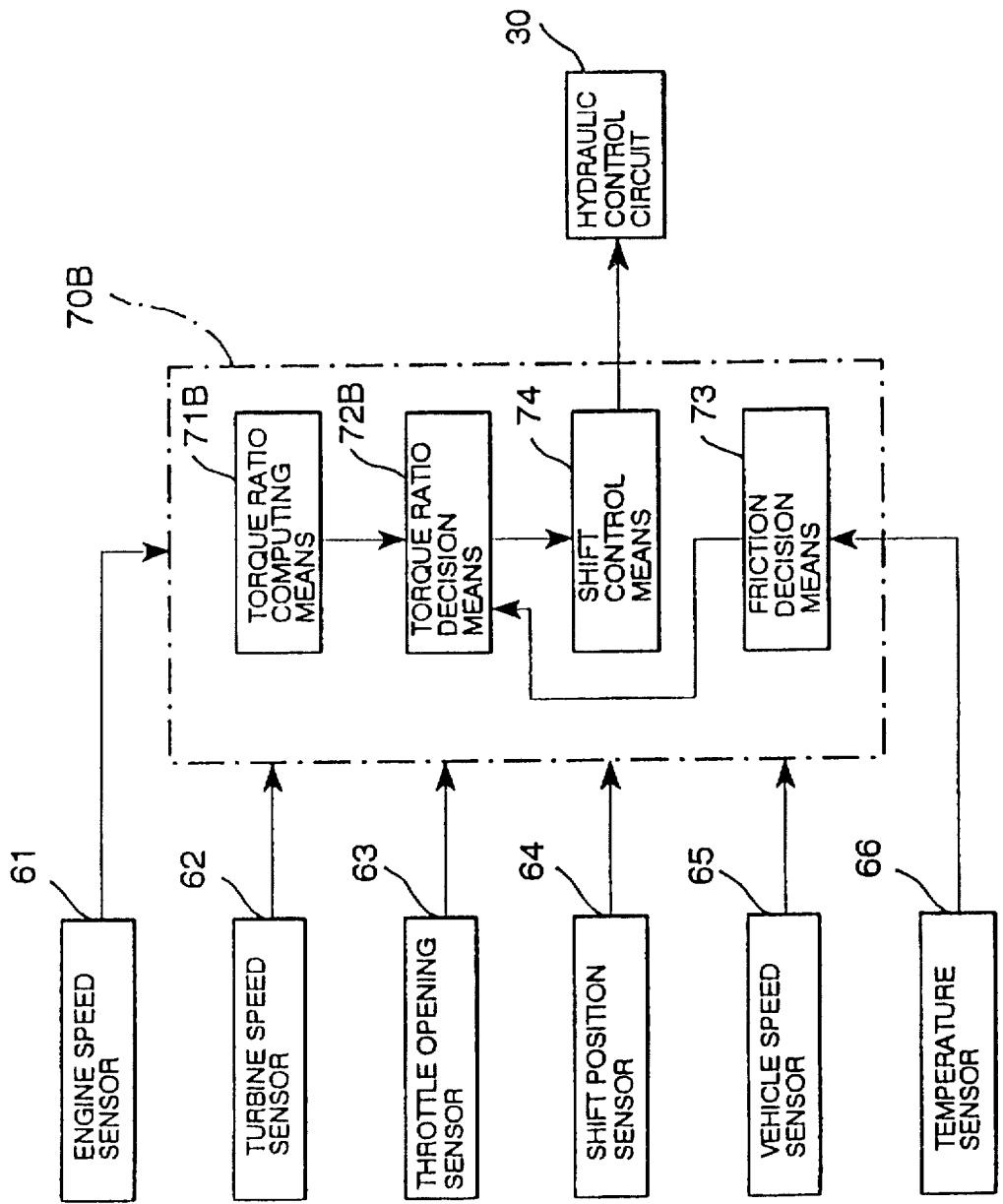
FIG. 7 is a block diagram showing an automatic transmission control system in accordance with another embodiment of the invention.
Figure 8:
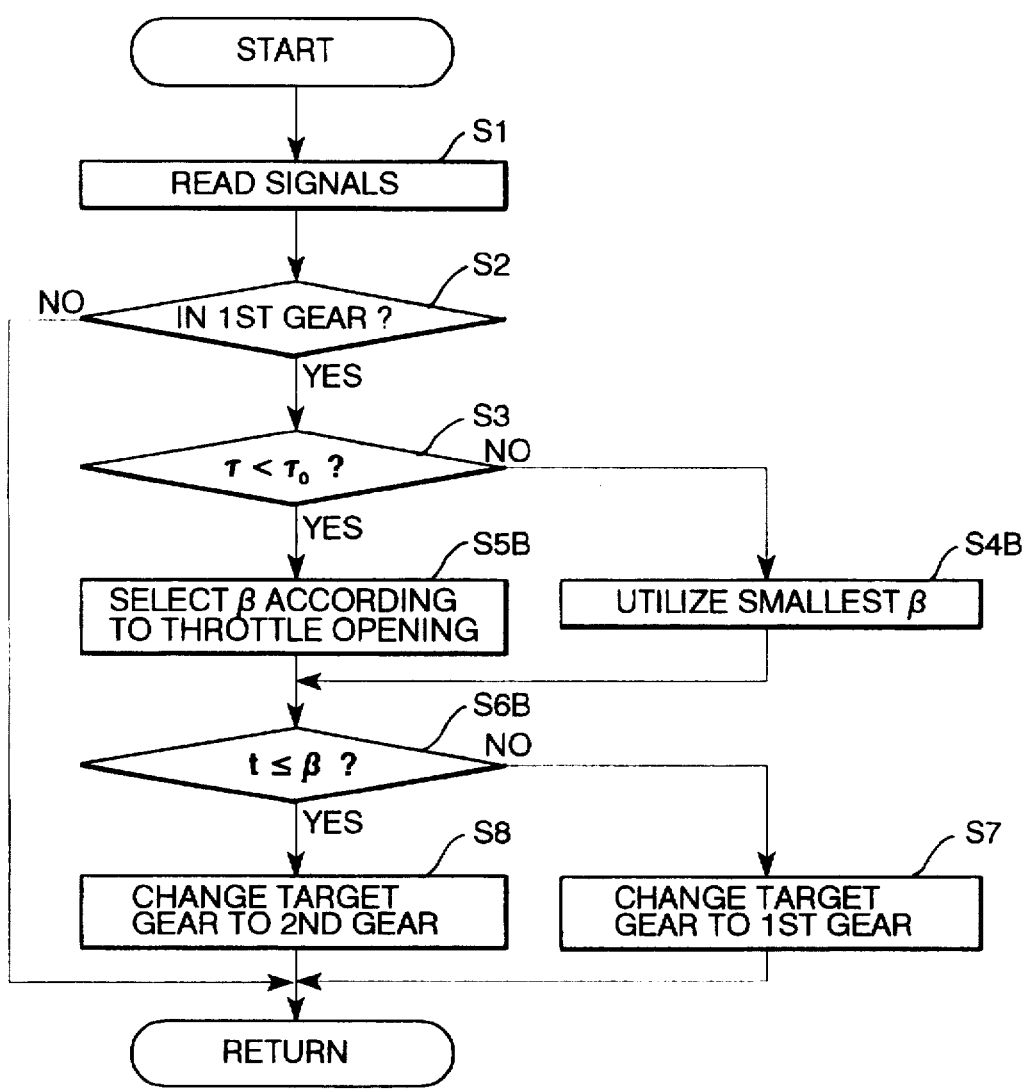
FIG. 8 is a flow chart illustrating the shift control sequence routine for the control system of FIG. 7.

FIGS. 6 through 8 show an automatic transmission control system in accordance with another embodiment of the invention.

Referring to FIG. 6 showing speed-ratio "e" and torque ratio "t" of the torque converter 2, $t_1$ and $t_2$ denote the torque at the engine output shaft 1 and the torque input to the transmission gear mechanism 10. The torque ratio "t" and speed-ratio "e" are inversely proportional. That is, the torque ratio "t" decreases as the speed-ratio "e" increases and the speed-ratio "e" decreases as the torque ratio "t" increases. The torque decision value β, which corresponds to the speed-ratio decision value α referred in the previous embodiment of the invention is unconditionally determined.

Speed-ratio computing means 71A and speed-ratio decision means 72A in the control unit 70A of the previous embodiment are replaced with a torque ratio computing means 71B and torque ratio decision means 72B in a control unit 70B, respectively. The torque ratio computing means 71B calculates the torque ratio "t" from its relationship with speed-ratio "e" shown in FIG. 6, and the torque ratio decision means 72B determines an upshift timing through comparing the torque ratio "t" with torque ratio decision value β.

The operation of second-to-third gear upshifting will be understood by reviewing the flow chart illustrating the upshift control sequence routine shown in FIG. 7. Steps S1 through S3 are the same as those explained previously for the first embodiment. Until the temperature τ has reached a specified decision temperature $τ_0$ at step S3, the torque decision value β is selected from values shown in Table II, in which throttle opening TVO are assessed at five values, at step S5B.

TABLE II

| TVO | 1/16 | 1/8 | 2/8 | 4/8 | 6/8 | Full |
|---|---|---|---|---|---|---|
| β | 1.8 | 1.5 | 1.2 | 1.0 | 0.9 | 0.9 |

As apparent from Table II, the lower the throttle opening TVO is, the higher the torque ratio decision value β becomes.

If the temperature τ reaches the decision temperature $τ_0$ at step S3, the smallest value in Table II, which is 0.9 in this embodiment, is selected and applied as an eventual torque ratio decision value β at step S4B. When the torque ratio "t" falls below the torque ratio decision value β at step S6B, an upshift to the second (2nd) gear as a target gear at step S8 is initiated. Values smaller than the smallest value established for working oil temperatures in a low range can be utilized as the torque ratio decision value β in a high range of working oil temperatures. This embodiment presented here provides identical results to the previously embodiment.

Figure 10:
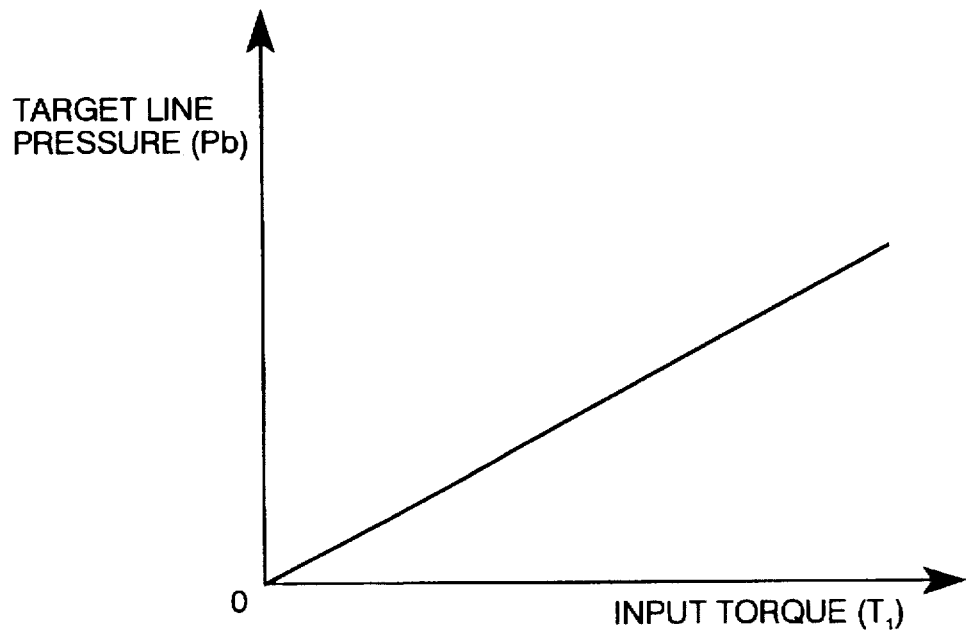
FIG. 10 shows a graph of the relation between input torque and target input torque.
Figure 11:
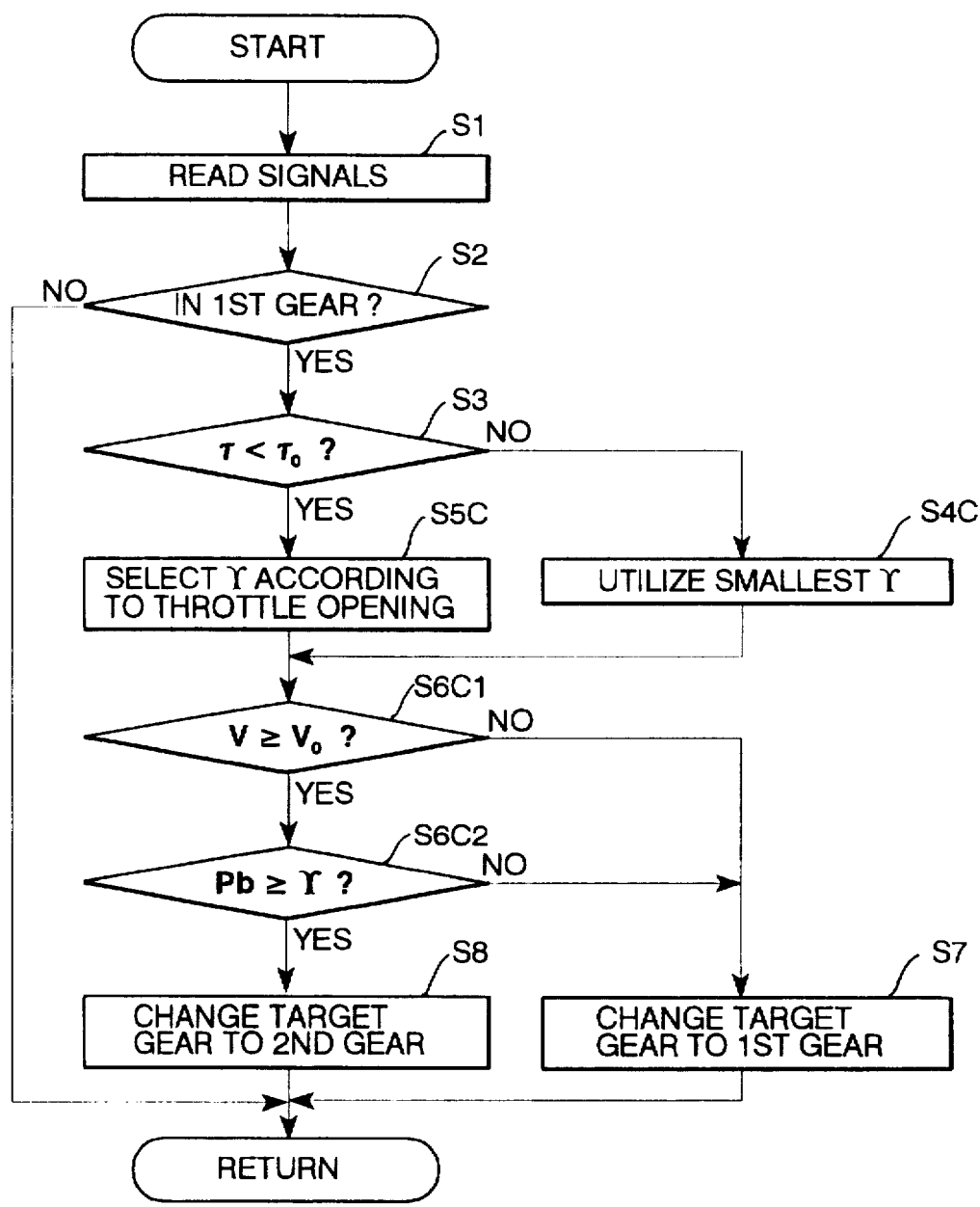
FIG. 11 is a flow chart illustrating the shift control sequence routine for the control system of FIG. 9.

The upshift control may be executed on the basis of line pressure as shown in FIGS. 9 through 11.

As shown in FIG. 9, a control unit 70C is provided with a torque sensor 67 in place of the speed sensors 61 and 62 in the previous embodiments, a line pressure control means 75 and target line pressure decision means 76 in place of the speed ratio computing means 71A or the torque ratio computing means 71B and the speed ratio decision means 72A or the torque ratio decision means 72B, respectively.

Input torque sensor 67 monitors input torque $T_1$ from the torque converter 2, in particular the turbine shaft 13, to the transmission gear mechanism 10. As shown in FIG. 10, the line pressure control means 75 sets target line pressure Pb proportional to the input torque $T_1$, and outputs a control signal to a duty solenoid valve 33 of a hydraulic control circuit 30 such that the actual line pressure, which is the secondary pressure at a regulator valve 32 shown in FIG. 3, reaches as close to the target line pressure Pb as possible. Target line pressure decision means 76 sets an upshift timing for locking the 2-4 brake 23 on the basis of comparison of the target line pressure Pb with a target line pressure decision value Y.

As specifically shown in a flow chart in FIG. 11 illustrating the upshift control sequence routine in which the utilization is made of line pressure and which performs first three steps 1 through 3 in the same manner as those described for the previous embodiments. If the working oil temperature τ has not attained a specified decision temperature $τ_0$, an appropriate target line pressure decision value γ is selected at step S5C as assigned to the throttle opening from a table (not shown) where the target line pressure decision value γ is established increasingly higher in relation to a decrease in throttle opening TVO. If the working oil temperature τ exceeds the decision temperature $τ_0$ at step S3, the smallest value is employed as the actual target line pressure decision value γ. In cases where the vehicle speed V exceeds a specified decision speed Vo at step S6C1, the upshift is initiated at step S8 when the eventual target line pressure Pb falls below the target line pressure decision value γ at step S6C2. However, if a value smaller than the smallest target line pressure decision value γ may be employed for working oil temperatures in a high range.

The target gear is maintained as the 1st gear at step S7 if the vehicle speed V has not exceeded the decision speed Vo at step S6C1, or if the eventual target line pressure Pb has not yet fallen below the target line pressure decision value γ at step S6C2 even when the vehicle speed V has exceeded the decision speed Vo at step S6C1.

According to the control system of the third embodiment, an upshift is initiated at input torque $T_1$ higher in a high range of the brake friction coefficient as compared to when it is in a low high range, and the input torque $T_1$ at which an upshift is initiated when the brake friction coefficient is in the high range becomes more higher as the throttle opening TVO decreasingly changes.

Figure 12:
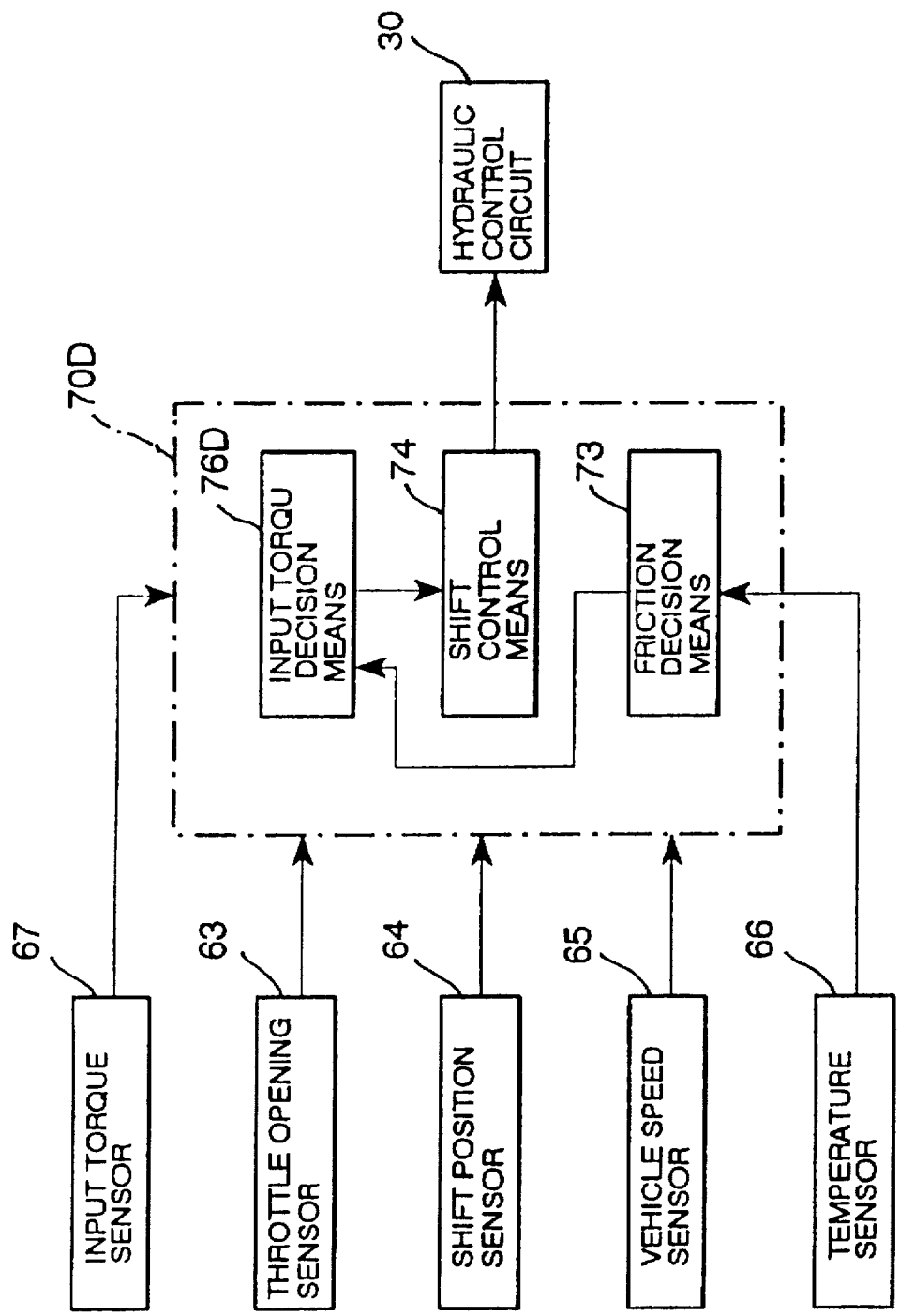
FIG. 12 is a block diagram showing an automatic transmission control system in accordance with another embodiment of the invention.
Figure 13:
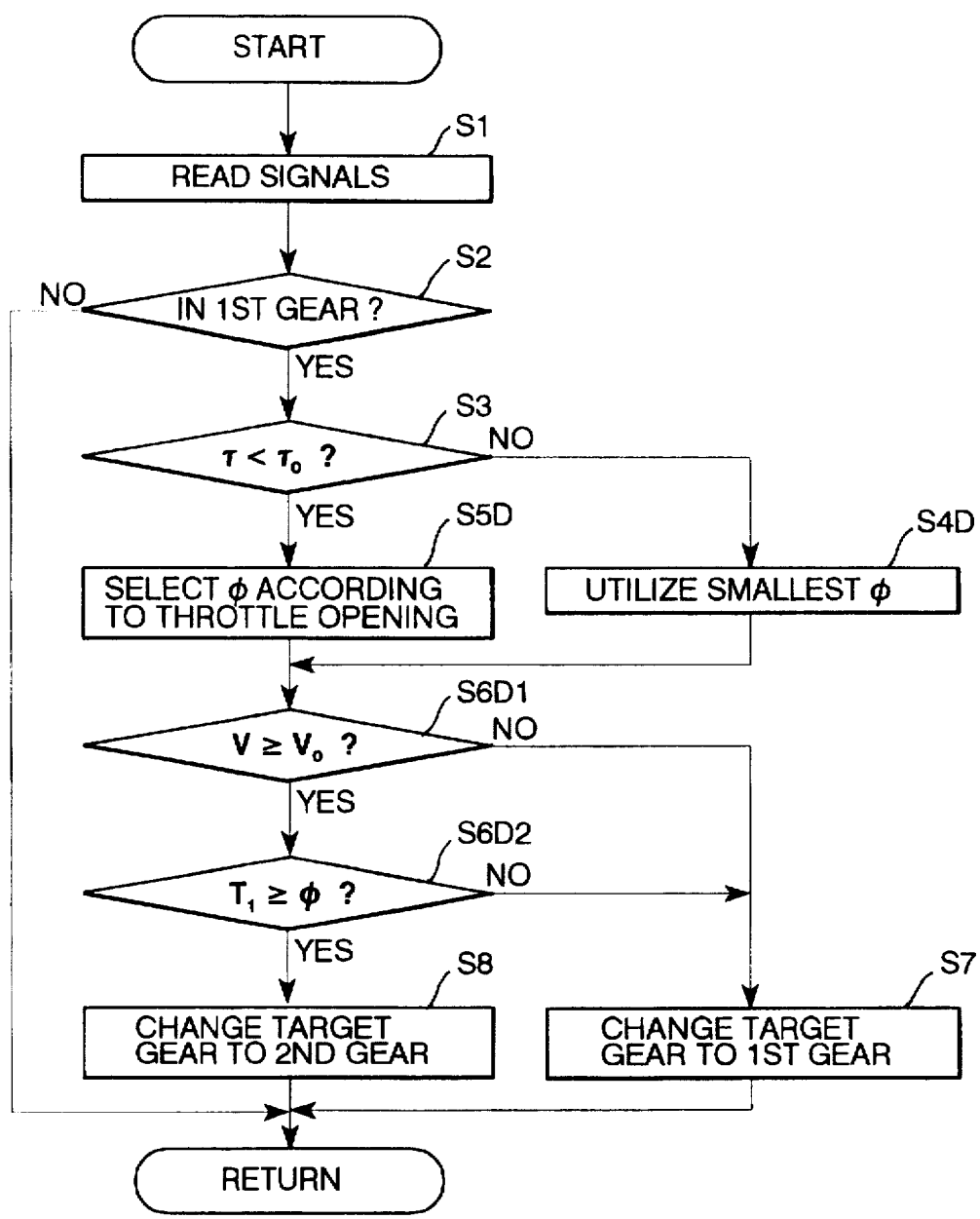
FIG. 13 is a flow chart illustrating the shift control sequence routine for the control system of FIG. 12.

FIGS. 12 and 13 show the control system in accordance with another embodiment of the invention. While, in the third embodiment, a target line pressure Pb, the alternative to input torque, is utilized as a parameter to establish a shift timing, the input torque $T_1$ may be directly utilized by an input torque decision means 77, incorporated in a control unit 70D a shown in FIG. 12, as the parameter to establish a shift timing.

The decision sequence is shown more specifically in FIG. 13. Steps S1 through S3 are executed in the same manner as those prescribed for the previous embodiments. As a result of a decision concerning the temperature of working oil made at step S3, it is determined that the working oil temperature τ is lower than a specified decision temperature $\tau_0$, an input torque decision value φ is selected according to throttle opening TVO monitored by a throttle sensor 63 at step S5D. Throttle opening TVO are assessed at five values like those in Table II such that the smaller the throttle opening TVO is, the higher the input torque decision value φ becomes. If the temperature τ has exceeded the decision temperature $\tau_0$, the smallest input torque decision value is utilized as an eventual value at step S4D. An upshift is initiated at step S8 at a time when actual input torque $T_1$ falls below the input torque decision value φ at step S6D2 while the vehicle speed V exceeds the decision speed Vo at step S6D1.

In place of directly detecting input torque by the torque sensor 67, the input torque $T_1$ may be substituted by engine torque, which can be directly detected by a sensor, or otherwise computed, multiplied by a torque ration.

Figure 14:
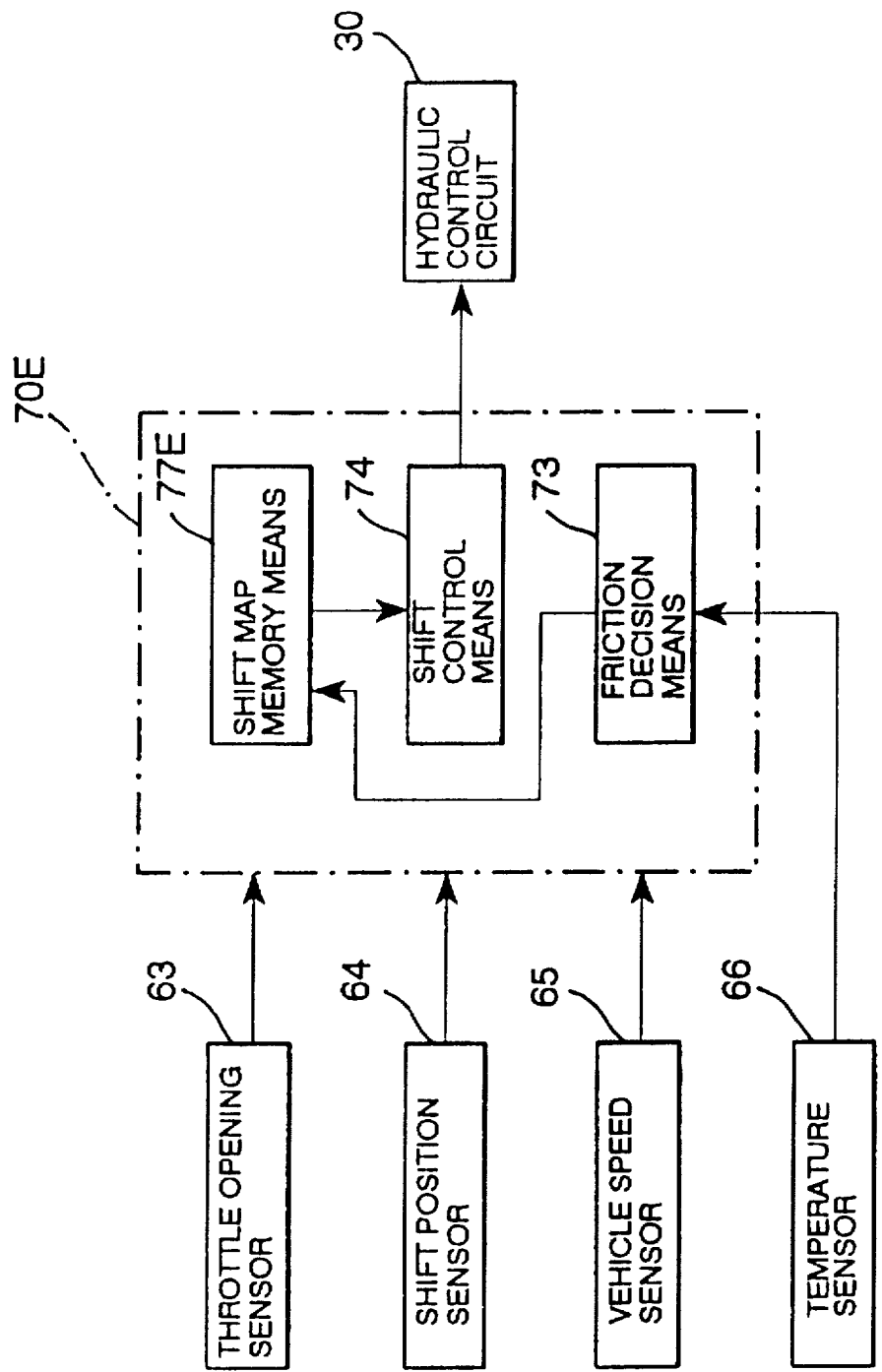
FIG. 14 is a block diagram showing an automatic transmission control system in accordance with still another embodiment of the invention.
Figure 15A:
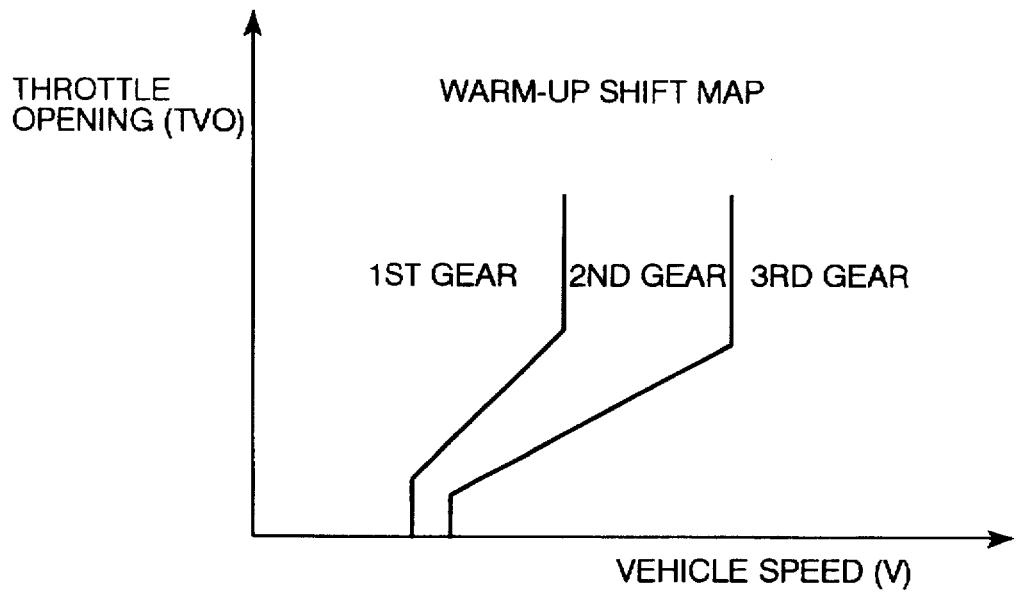
FIG. 15(A) is an illustration showing the first gear shift characteristic pattern.
Figure 15B:
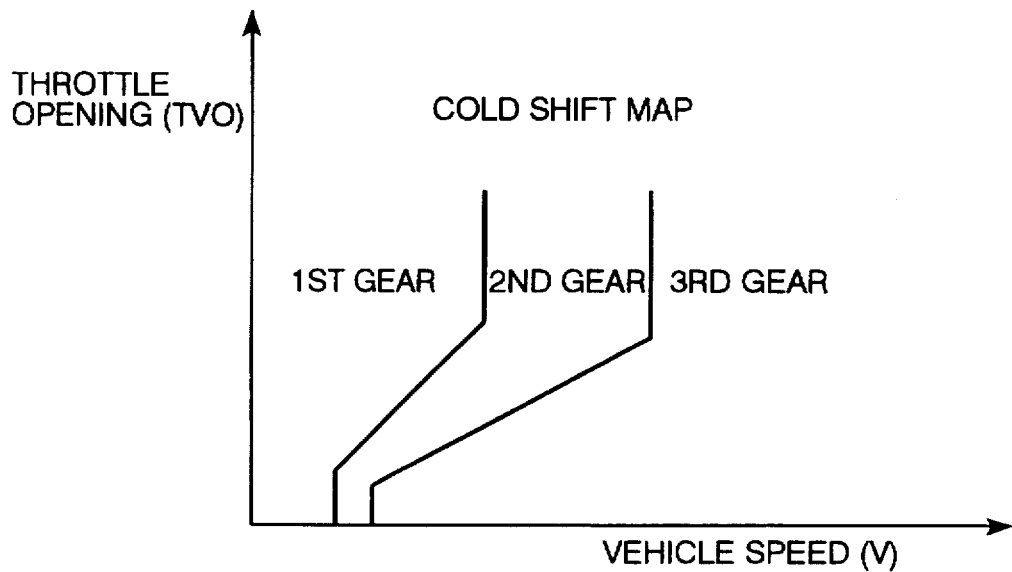
FIG. 15(B) is an illustration showing the second gear shift characteristic pattern.

FIGS. 14 and 15 show an automatic transmission control system according to still another embodiment of the invention. A control unit 70E of this embodiment incorporates a shift map memory 77 which stores two shift maps, namely a first shift map shown in FIG. 15(A) for use when the engine has been warmed up (which will be hereafter referred to as a warm-up shift map) and a second shift map shown in FIG. 15(B) for use when the engine is still cold (which will be hereafter referred to as a cold shift map). Both shift maps utilize vehicle speed V and throttle opening TVO as shift timing parameters. FIGS. 15(A) and 15(B) show, by way of example, scheduled shift lines for gear shifts between 1st and 2nd gears and 2nd and 3rd gears. When at least one of engine speed and throttle opening changes crossing the shift line, the automatic transmission 2 shifts from one to another defined by the line. The cold shift lines are designed and adapted so as to cause shifts at lower speed-ratios (i.e. higher output torque) than the warm-up shift lines. Specifically, as seen in FIGS. 15(A) and 15(B), the cold shift line denotes shift speeds lower than the corresponding warm-up shift line over the entire extent of throttle opening.

Figure 16:
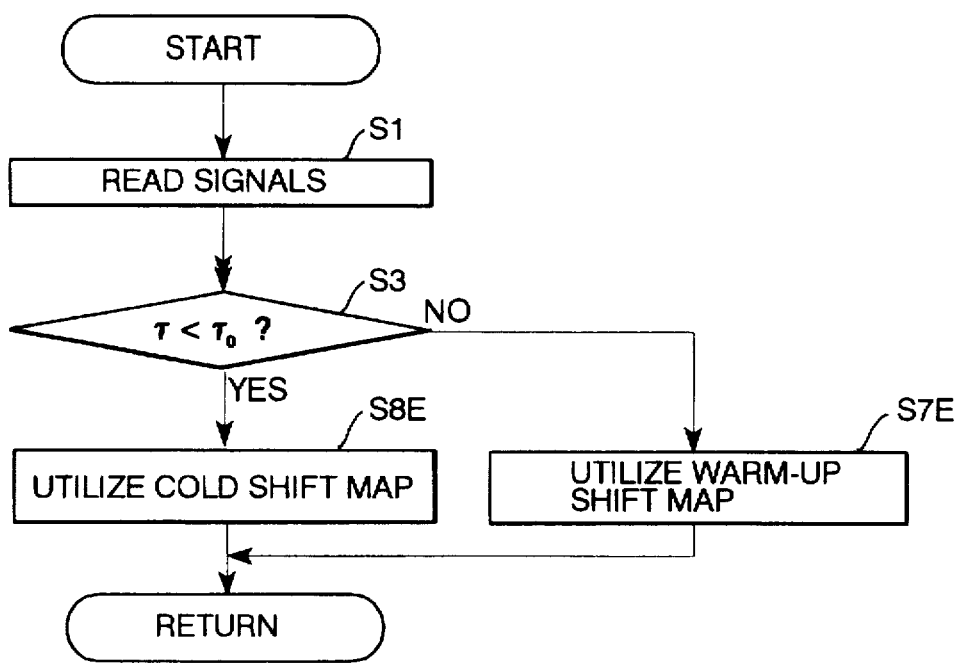
FIG. 16 is a flow chart illustrating the shift control sequence routine for the control system of FIG. 14.

As shown in a flow chart of the upshift control sequence routine in FIG. 16, the shift control means 74 establishes a shift timing from the warm-up shift map at step S7E in the range where the working oil temperature τ exceeds the decision temperature $\tau_0$. Conversely, the cold shift map is utilized to establish a shift timing at step S8E in the range where the working oil temperature τ has not reached the decision temperature $\tau_0$.

This embodiment of the invention provides the same effects as those of the previously embodiments. That is, an upshift is initiated at a speed-ratio is lower, i.e. input torque, higher in the range of low oil temperatures than in the high range of low oil temperatures. Together, the shift timing is established depending upon, but not unconditionally on, throttle opening TVO. In the same manner as described in the previous embodiments, it is enabled to initiate an upshift, even when the parameter demonstrates a high friction coefficient, at input torque T1 increased higher with a decrease in throttle opening TVO.

Figure 17:
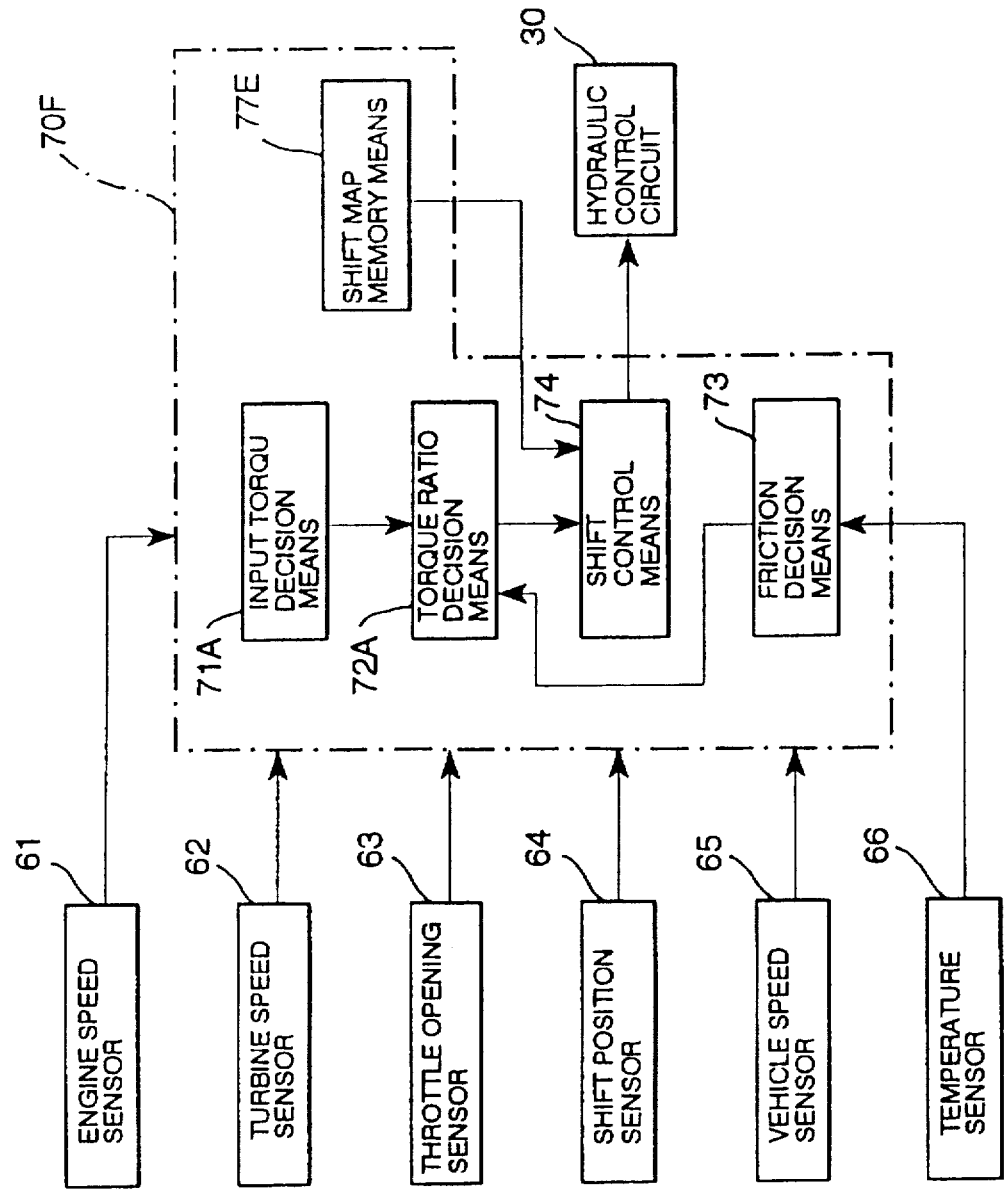
FIG. 17 is a block diagram showing an automatic transmission control system in accordance with a further embodiment of the invention.

While, in the previous embodiments, the shift timing is established, during both low and high oil temperature conditions, based on a comparison of the parameter concerning a torque ratio and its decision value or from on shift maps, it may also be separately established, in particular, from shift maps during a high temperature condition, and based on a comparison of an torque ratio and its decision value during a low temperature condition. In this case, the gear shift must always be initiated at a torque ratio higher during a low temperature condition than during a high temperature condition. This separate establishment of shift timing is realized by incorporating a speed ratio decision means 72F and a shift map memory 77F into a control unit 70F as shown in FIG. 17.

Figure 18:
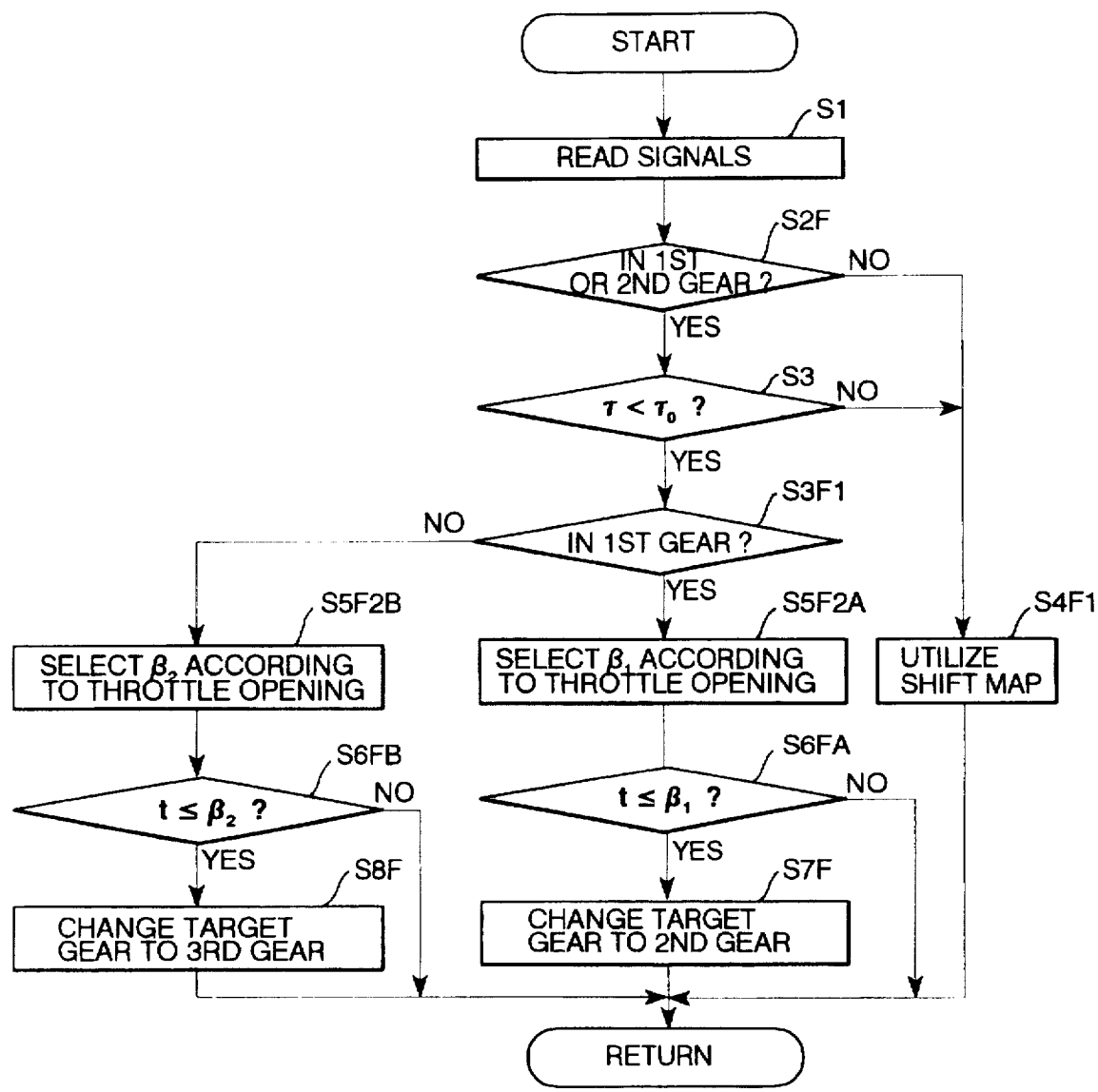
FIG. 18 is a flow chart illustrating the shift control sequence routine for the control system of FIG. 17.

As shown in a flow chart of the upshift control sequence routine in FIG. 18, the shift timing is basically established from a shift map when the automatic transmission 2 is in higher gears than the second gear and on the basis of throttle opening when the automatic transmission 2 is in the first gear and the second gear.

When it is determined at step S2F that the automatic transmission 2 is in a gear other than the first gear or the second gear and if it is determined at step S3F that the working oil temperature τ has reached the decision temperature $\tau_0$ even when the automatic transmission 2 is in the first gear or the second gear at step S2F, a shift control means 74 establishes a shift timing directly from a shift map, such as a warm-up shift map shown in FIG. 15(A), at step S4F1. If, in the first gear or the second gear, the working oil temperature τ is still below the decision temperature $\tau_0$, the shift timing is established according to throttle opening TVO rated at torque decision values $β_1$ or $β_2$.

Figure 19A:
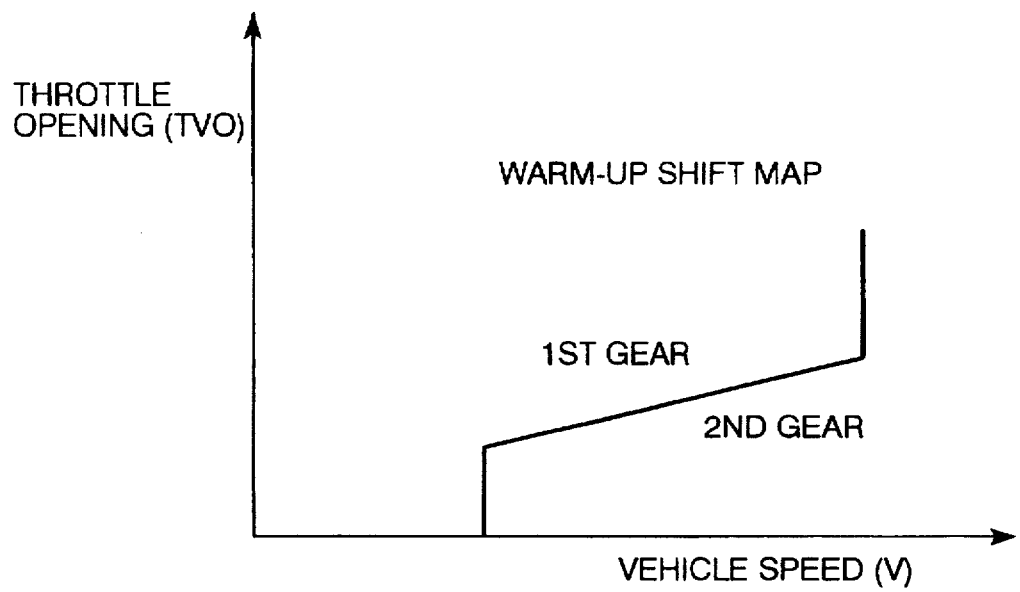
FIG. 19(A) is an illustration showing the first gear shift characteristic pattern.
Figure 19B:
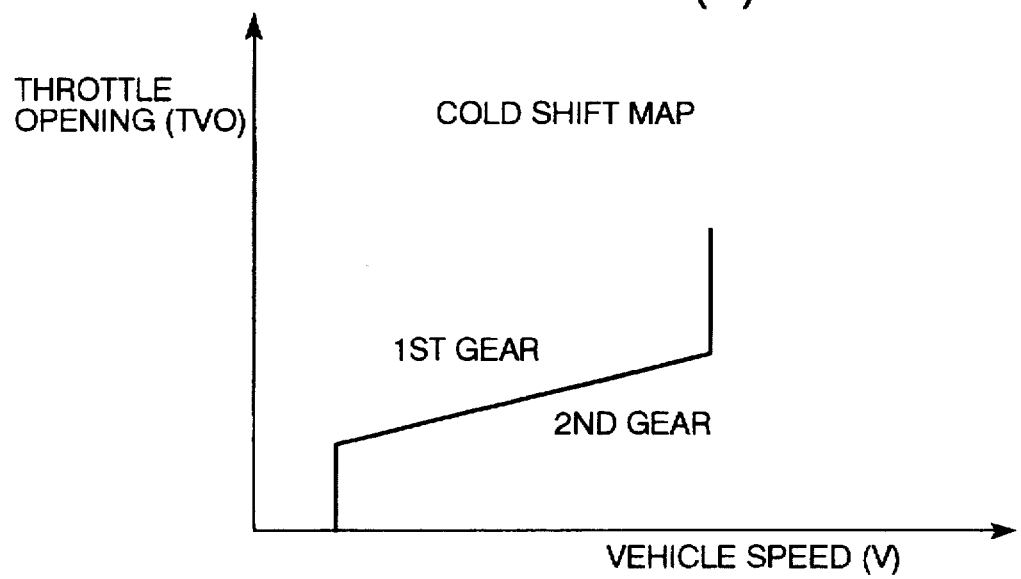
FIG. 19(B) is an illustration showing the second gear shift characteristic pattern.

If it is determined at step S3F1 that, while the working oil temperature τ is below the decision temperature $\tau_0$, the automatic transmission 2 is in the first gear, then, after selecting the torque decision value $β_1$ at step S5F2A, a decision is made at step S6FA as to whether the torque ratio "t" has fallen below the torque decision value $β_1$. At a time torque ratio "t" falls below the torque decision value $β_1$, the target gear is changed to the 2nd gear and an upshift to the 2nd gear is initiated at step S7F. On the other hand, if it is determined at step S3F that, while the working oil temperature τ is still below the decision temperature $\tau_0$, the automatic transmission 2 is in the second gear, then, after selecting the torque decision value $β_2$ at step S5F2B, a decision is made at step S6FB as to whether the torque ratio "t" has fallen below the torque decision value $β_2$. At a time torque ratio "t" falls below the torque decision value $β_2$, the target gear is changed to the third (3rd) gear and an upshift to the third (3rd) gear is initiated at step S8F. In this embodiment, the shift maps shown in FIGS. 15(A) and 15(B) may be replaced with shift maps, which define only gear shifts between the first and second gears, as shown in FIG. 19(A) and 19(B), respectively.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A control system for an automatic transmission equipped with a torque converter and a plurality of friction coupling elements selectively locked and unlocked to provide desired gears, a specific one of said friction coupling elements being locked to provide a specific gear, said control system comprising:

frictional condition monitoring means for monitoring a frictional condition of said specific friction coupling element using a friction-related parameter in relation to a friction coefficient of said specific friction coupling element;

shift control means for initiating locking of said specific friction coupling element to execute a gear shift to said specific gear at a level of input torque to said automatic transmission from said torque converter higher when said friction-related parameter demonstrates that said friction coefficient is high as compared to a predetermined friction related parameter than when said friction-related parameter demonstrates the said friction coefficient is low as compared to said predetermined friction related parameter.

2. An automatic transmission control system as defined in claim 1, wherein said specific friction coupling element comprises brake means including a brake drum and a brake band.

3. An automatic transmission control system as defined in claim 1, wherein said specific friction coupling element is locked to place said automatic transmission into a second gear as said specific gear.

4. An automatic transmission control system as defined in claim 1, wherein said frictional condition monitoring means comprises a temperature sensor for detecting a temperature of working oil applied to said specific friction coupling element.

5. An automatic transmission control system as defined in claim 1, and further comprising a torque transmission condition monitoring means for monitoring a torque transmission condition of said torque converter using a torque-related parameter in relation to a torque ratio of said torque converter, wherein said shift control means monitors said torque-related parameter, causes locking said specific friction coupling element when said torque-related parameter demonstrates a torque ratio higher than a specified decision ratio, and changes said decision ratio according to said friction-related parameter such that said gear shift is initiated at a torque ratio higher when said friction-related parameter demonstrates a high friction coefficient than when demonstrating a low friction coefficient.

6. An automatic transmission control system as defined in claim 5, and further comprising throttle condition monitoring means for monitoring an operated condition of an engine throttle using a throttle-related parameter in relation to throttle opening of said engine throttle, wherein said shift control means causes locking said specific friction coupling element at a high torque ratio when, while said friction-related parameter demonstrates a high friction coefficient, said throttle-related parameter demonstrates small throttle opening than when said friction-related parameter demonstrates a friction coefficient is low.

7. An automatic transmission control system as defined in claim 1, and further comprising a vehicle speed condition monitoring means for monitoring a speed of the vehicle using a speed-related parameter in relation to a vehicle speed of the vehicle and torque transmission condition monitoring means for monitoring a level of input torque transmitted to said automatic transmission from said torque converter, wherein said shift control means monitors said speed-related parameter, causes locking said specific friction coupling element when, while said speed-related parameter demonstrates that a vehicle speed meets a predetermined gear shift condition, said torque-related parameter demonstrates a ratio than a specified decision ratio, and changes said decision ratio such that said gear shift is initiated at a level of said input torque higher when said friction-related parameter demonstrates a high friction coefficient than when demonstrating a low friction coefficient.

8. An automatic transmission control system as defined in claim 1, and further comprising a shift characteristic memory means for storing predetermined first and second shift characteristics defined using parameters in relation to vehicle speed and throttle opening, wherein said shift control means causes locking said specific friction coupling element based on said first shift characteristic when said friction-related parameter demonstrates a low friction coefficient and based on said second shift characteristic when demonstrating a high friction coefficient.

9. An automatic transmission control system as defined in claim 8, wherein said first and second shift characteristics are established such that, for same throttle opening, a gear shift to said specified gear is caused at a speed lower if said gear shift attributes said second shift characteristic than if said gear shift attributes said first shift characteristic.

10. An automatic transmission control system as defined in claim 9, wherein said specific friction coupling element comprises brake means including a brake drum and a brake band.

11. An automatic transmission control system as defined in claim 10, wherein a gear shift from a first gear to a second gear as said specified gear is caused at a speed lower if said first to second gear shift attributes said second shift characteristic than if said first to second gear shift attributes said first shift characteristic.

12. An automatic transmission control system as defined in claim 1, and further comprising a shift characteristic memory means for storing predetermined a shift characteristic defined using parameters in relation to vehicle speed and throttle opening, respectively, and torque transmission condition monitoring means for monitoring a torque transmission condition of said torque converter using a torque-related parameter in relation to a torque ratio of said torque converter, wherein said shift control means causes locking said specific friction coupling element at a time defined by said shift characteristic when said friction-related parameter demonstrates a low friction coefficient and at a time when, while said friction-related parameter demonstrates a high friction coefficient, said torque-related parameter demonstrates a ratio higher than a specified decision ratio, said specified decision level being established in such a way that said gear shift is achieved at input torque higher when being caused due to said friction-related parameter demonstrating a high friction coefficient than when being caused due to said friction-related parameter demonstrating a low friction coefficient.

13. An automatic transmission control system as defined in claim 12, and further comprising a throttle condition monitoring means for monitoring an operated condition of an engine throttle using a throttle-related parameter in relation to throttle opening of said engine throttle, wherein said shift control means changes said decision ratio according to said throttle-related parameter.

14. A control system for an automatic transmission equipped with a torque converter and a plurality of friction coupling elements selectively locked and unlocked to provide desired gears, a specific one of said friction coupling elements being locked to provide a specific gear, said control system comprising:

a vehicle speed condition monitoring means for monitoring a speed of the vehicle using a speed-related parameter in relation to a vehicle speed of the vehicle;

frictional condition monitoring means for monitoring a frictional condition of said specific friction coupling element using a friction-related parameter in relation to a friction coefficient of said specific friction coupling element;

throttle condition monitoring means for monitoring an operated condition of an engine throttle using a throttle-related parameter in relation to throttle opening of said engine throttle;

a shift characteristic memory means for storing predetermined first and second shift characteristics defined using parameters in relation to vehicle speed and throttle opening; and shift control means for selecting said specific friction coupling element to lock based on said first shift characteristic when said friction-related parameter demonstrates that said friction coefficient is low and based on said second shift characteristic when said friction-related parameter demonstrates that said friction coefficient is high, and for determining a gear toward which a gear shift must be caused on the basis of said parameters in relation to a vehicle speed, a friction coefficient of said specific friction coupling element and engine throttle opening, respectively, according to a selected shift characteristic, said gear shift to said specific gear being caused at a vehicle speed lower if said gear shift attributes said second shift characteristic than if said first to second gear shift attributes said first shift characteristic.

15. An automatic transmission control system as defined in claim 14, wherein said specific friction coupling element comprises a brake means including a brake drum and a brake band.

16. An automatic transmission control system as defined in claim 15, wherein a gear shift from a first gear to a second gear is caused at a speed lower if said first to second gear shift attributes said second shift characteristic than if said first to second gear shift attributes said first shift characteristic.

* * * * *